United States Patent [19]

Neahr, II et al.

[11] Patent Number: 4,757,542
[45] Date of Patent: Jul. 12, 1988

[54] SPEECH SYNTHESIZER METHOD AND APPARATUS

[75] Inventors: John R. Neahr, II, Reed City; Arthur R. McKendry, Flint; Aysegul Ozkahyaoglu; Darrel A. Dolph, both of Big Rapids, all of Mich.

[73] Assignee: Nartron Corporation, Reed City, Mich.

[21] Appl. No.: 804,812

[22] Filed: Dec. 4, 1985

[51] Int. Cl.⁴ ............................................. G10L 1/00
[52] U.S. Cl. .................................... 381/51; 381/43; 364/513.5
[58] Field of Search .................. 381/36–37, 381/41–43, 51; 364/424, 513.5

[56] References Cited
U.S. PATENT DOCUMENTS 4,461,023  7/1984  Katayama ........................... 381/43
4,501,012  2/1985  Kishi et al. ......................... 381/43
4,506,378  3/1985  Noso et al. ......................... 381/43
4,509,129  4/1985  Yatsunami et al. ................. 381/51
4,593,403  6/1986  Kishi et al. ......................... 381/43

Primary Examiner—Peter S. Wong
Attorney, Agent, or Firm—Watts, Hoffmann, Fisher & Heinke

[57] ABSTRACT

A speech synthesizer control circuit for use in a vehicle. The circuit includes a number of features which provide cost effectiveness while maintaining speech synthesizer reliability. One feature of the invention is use of a counter circuit interposed between a control circuit and a memory where messages are stored. The counter is controllably clocked by the controller to create an address within the memory for a particular message. Other features of the invention include control of speech volume, chime generation, and voltage protocals in the speech synthesizer control circuit.

14 Claims, 6 Drawing Sheets

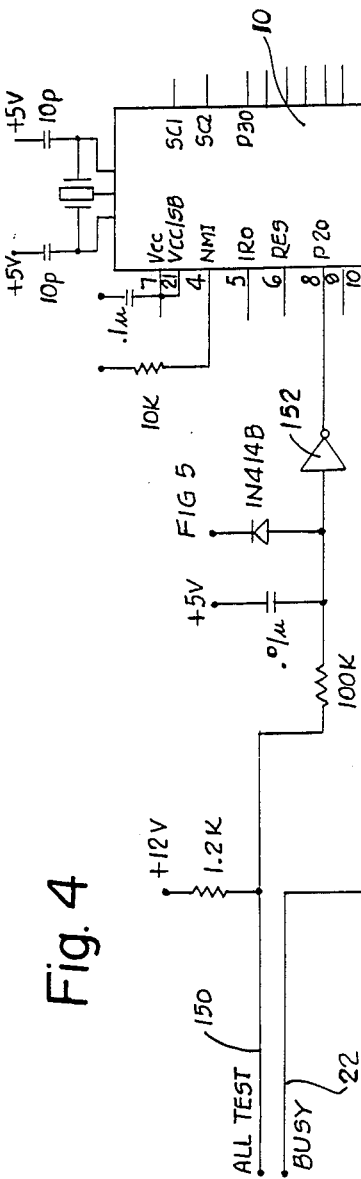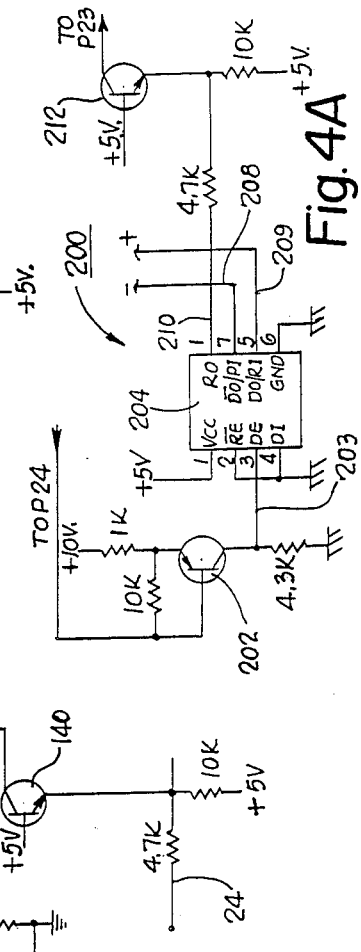
Fig. 4
Fig. 4A

SPEECH SYNTHESIZER METHOD AND APPARATUS

DESCRIPTION

1. Technical Field

The present invention relates to a speech synthesizer particularly suited for use in a motor vehicle.

2. Background Art

Speech synthesizers are now commonly used in motor vehicles, particularly automobiles, to warn the vehicle operator regarding the status of the motor vehicle. Speech synthesizers have also been used in interactive control systems utlizing voice recognition to interpret and execute an operator's voice commands.

When used as a warning system, a control system accesses data from a number of transducers located throughout the vehicle that sense motor vehicle condition. These transducers generate electrical signals in response to sensed conditions and as an example, a transducer monitors oil pressure within the vehicle engine and produces an indication when that pressure is too low. One or more control circuits, typically including microprocessor controllers, monitor these status conditions and make determinations regarding what messages should be enunciated by the speech synthesizer unit to warn the user with a message such as "The oil pressure is low, to avoid damage to your engine you should have a maintenance check".

Different messages are presented in different ways to elicit different motorist responses. Certain voice messages are accompanied by chimes whose volume and repetition rate are controlled. Certain messages are repeated every time the condition is sensed and others are enunciated only once per ignition switch closure.

A speech synthesizer unit used in a vehicle must operate in the electrically noisy environment encountered in the vicinity of an internal combustion engine. A speech synthesizer system must also provide clearly recognizable messages and effectively monitory status conditions throughout the motor vehicle. These criteria should be accomplished as effectively and inexpensively as possible without trade-offs in reliability and message clarity.

DISCLOSURE OF THE INVENTION

The present speech synthesizer system includes features for accomplishing the aforementioned goals in a cost effective yet reliable manner suitable for use either alone or in combination with a voice recognition command system.

In accordance with one aspect of the invention, the speech synthesizer system includes a control circuit for controlling enunciation of one or more voice messages digitally stored in a memory circuit. Each message is made up of one or more audible sounds. The control circuit monitors the status condition of the vehicle and accessed the memory circuit through a counter circuit which sequentially counts through addresses to the starting address for a particular sound. A speech synthesizer circuit accesses data at that starting address and converts that data into an audible sound. By chaining together the audible sounds a message is enunciated by the speech synthesizer system.

The use of a counter by the control circuit to access data in the memory circuit is an economical feature of the invention. Special address latching circuitry is not required. The memory circuit can be programmable EPROM rather than a special synthesizer memory circuit specifically designed for storing digital representations of audible messages. In response to receipt of a status condition the control circuit activates the counter circuit to count to a particular EPROM address and transmits a control signal to cause the speech synthesizer to access a memory location and initiate message enunciation.

The control circuitry used for speech synthesis includes semiconductor circuits having specific electrical power requirements. In accordance with another aspect of the invention, ground potential for the control system, including the speech synthesizer, is chosen to be other than vehicle ground. Specifically the circuit includes a power circuit coupled to a vehicle battery and vehicle ignition to generate first and second positive voltages above vehicle ground wherein one of the positive voltages functions as a control system ground potential. This convention requires leval shifting circuitry for interfacing control system electronics and vehicle electronics. This disadvantage is balanced by the fact that no negative potential generating circuitry is required since any negative potential in the control system is negative with respect to the control system ground but not with respect to the vehicle ground.

The system includes a chime circuit which provides an audible signal of a certain frequency and duration. This chime circuit is operational even in the event of a failure in the speech synthesizer unit so that an audible message can be transmitted to the user to aprise him or her of the status of the motor vehicle. The preferred chime circuit includes a mixing output or node coupled to an output from the speech synthesizer unit. Specialized control circuitry causes one or the other of the signals i.e. either the chime signal or the speech synthesizer signal to pass through this mixing node in order to produce clear, ungarbled messages. As a further enhancement of htae chime circuit, bi-polar signals relative a reference potential are generated from a chime amplifier. These bi-polar signals enhance clarity and produce a pleasing sound.

Other features of the invention include volume control and communications protocols for use in the speech synthesizer control system. In one embodiment the speech synthesizer communicates with a command processor in the vehicle which monitors status conditions throughout the vehicle. A unique communications protocol has been adopted which enhances reliability of the speech unit in sending and receiving messages.

One aspect of the invention is a reliable, yet cost effective speech synthesizer unit for use in a motor vehicle. This and other objects, advantages and features of the invention will become better understood when a detailed description of a preferred embodiment is described in conjunction with the accompanying drawings.

BRIEF DESCRIPTION OF THE DRAWINGS

FIG. 4 shows the control processor of FIGS. 2 and 3 and circuitry for supporting communication between the control processor and other circuitry within the motor vehicle;

FIG. 4A shows an alternate communications circuit;

BEST MODE FOR CARRYING OUT THE INVENTION

Figure 1:
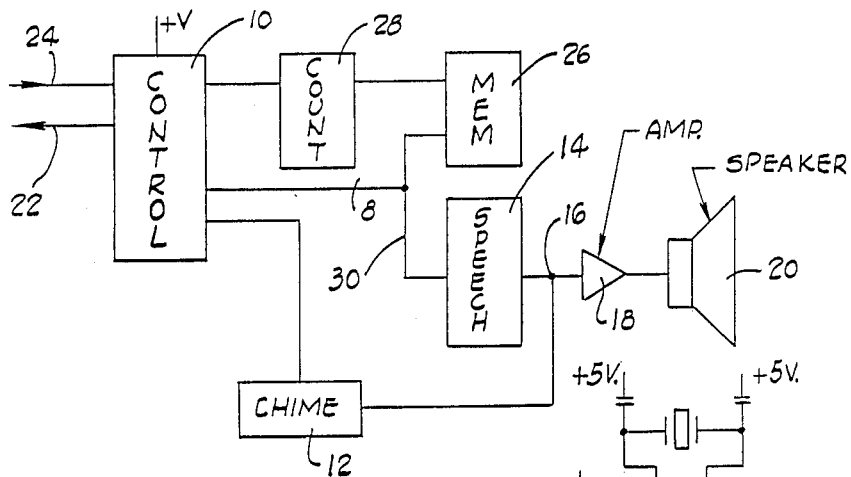
FIG. 1 is a schematic overview of a speech control system constructed in accordance with the invention.

Turning now to the drawings, FIG. 1 is a schematic of a speech synthesizer portion of an automobile control system. The system includes a control processor 10 coupled to a chime circuit 12 and a speech synthesizer unit 14. The speech synthesizer unit 14 and chime circuit 12 generate analog signal outputs that are coupled to a mixing node 16 which is input to an audit amplifier 18 that drives a speaker 20. Although speaker 20 is illustrated in FIG. 1, it should be appreciated that the control system typically will utilize a radio speaker in the vehicle.

The control processor 10 is coupled to other circuitry within the vehicle via two communication paths 22, 24. These paths are used to aprise the control processor 10 regarding the status of the motor vehicle so that an appropriate message and or chime and message can be generated. The control processor 10 also includes a status indicating capability for indication of busy status along the output communications path 22 to the automobile control system.

The speech synthesizer unit 14 is coupled to a memory circuit 26 which stores digital representations of the messages to be articulated. Under control of the control processor 10, the speech unit 14 accesses a digital representation of an audible sound stored in the memory 26 and converts the digital representation beginning into an audible message. The control processor 10 dictates which of the memory addresses the speech unit 14 accessed so that by chaining or concatenating together different audible signals, a complete message can be generated. The memory unit stores short words or phases. To create a given message, the speech unit 14 may access a number of different starting addresses for these words or phases.

In a manner to be described more completely below, the control processor 10 dictates the starting address for a speech generation operation via a counter 28 coupled to the control circuit 10. In response to an activation signal, the counter 28 begins counting until an appropriate memory location for the memory circuit 26 is reached. At that time, the control circuit 10 stops the counter and generates a message to the synthesizer unit 14 indicating message data is available on a data bus 30 coupling the speech unit 14 and the memory circuit 26. While the speech circuit 14 accesses the data stored in the memory 26, the control circuit 10 resets the counter 28 in preparation for the next memory data access by the speech unit 14.

Figure 2:
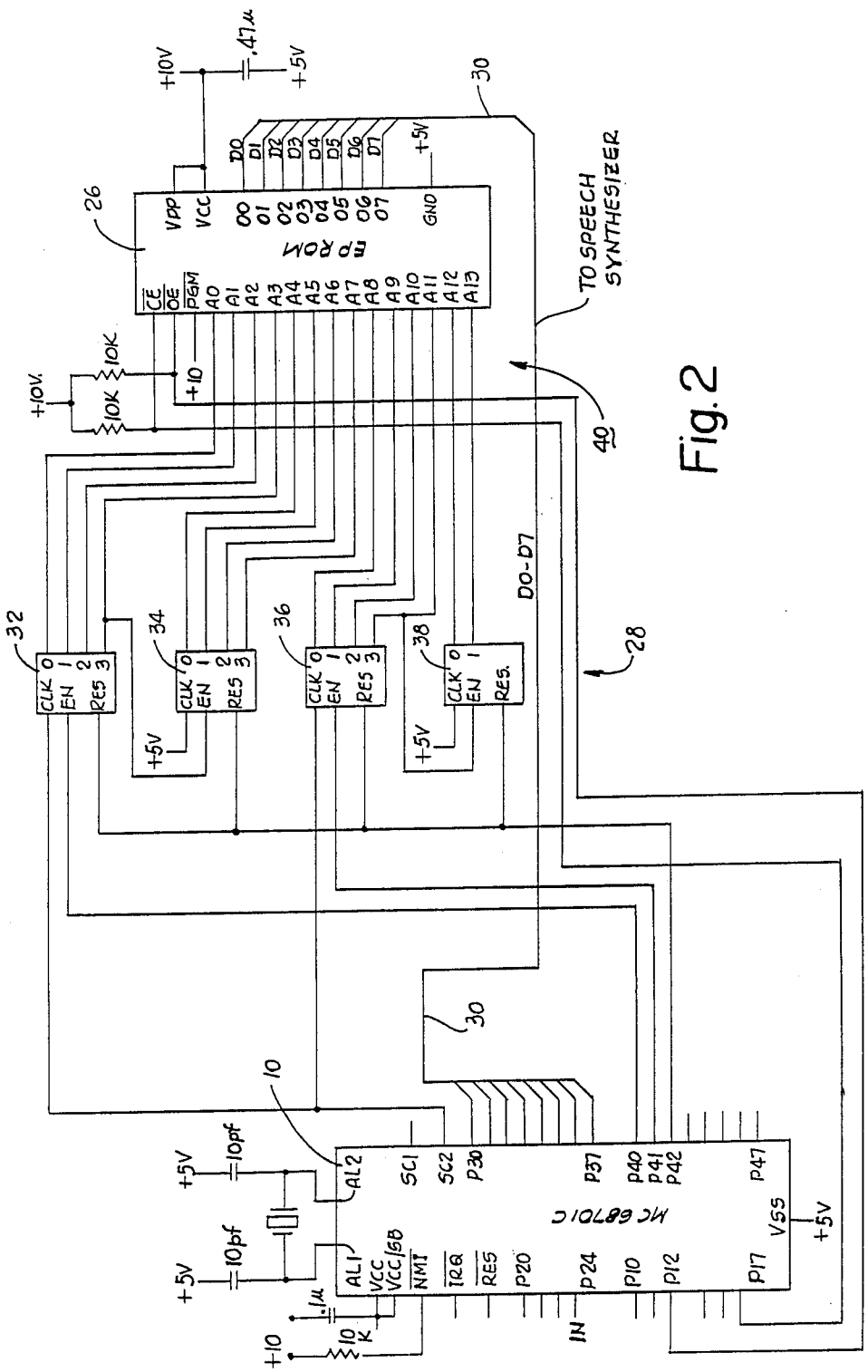
FIG. 2 shows a speech system control processor coupled to a memory circuit for storing digital representations of voice messages.

Turning now to FIG. 2, like reference numerals are used throughout for common circuit elements so that it is noted that a control microprocessor 10 located in the left hand portion of FIG. 2 corresponds to the control processor 10 of FIG. 1. The specific microprocessor chosen for the control circuit is not critical to the invention. The disclosed microprocessor is an 8 bit general purpose microprocessor having an internal 2 kilobyte ROM operating system. The operating system executes communications functions as well as voice and chime generating operations.

Returning to FIG. 2, the control processor 10 and memory unit 26 are each coupled to a series of four 4 bit counters, 32, 34, 36, 38. In response to communications messages at pin P24, the control processor 10 determines which status message or chime combination is needed. To initiate message generation, the controller 10 clocks the counters in a manner to produce an appropriate combination of 14 signals on a 14 bit address bus 40 made up of outputs from the 4 counters 32, 34, 36, 38. In this way an appropriate memory address can be designated as a starting address for the speech synthesizer 14 to access memory data.

Two counters 32, 34 are grouped together to form a first 8 bit counter and two counters 36, 38 are grouped together to form a second 6 bit counter. Whether a counter is active at a particular time is determined by the status at pins P40 and P41 on the microprocessor controller 10. These pins are coupled to enable inputs on the counters 32, 36. When pin P40 is high, the counter 32 is active and responds to clocking signals from pin "SC2" on the microprocessor controller 10. When pin P41 on the microprocessor 10 is high the counter 36 is also active so that one or both of the counters can be active at the same time and respond to clocking signals from the microprocessor controller 10.

When an appropriate address has been generated on the 14 bit address bus, the controller stops clocking the counters and causes the memory circuit 26 to respond to the address bus signals. This is accomplished by a signal labeled "CE" (chip enable) on the memory circuit 26 which is coupled to pin P17 on the microporcessor. The particular data at the memory location represented by the input address is output along the data bus 30 in response to an output enable "OE" signal from pin P12 on the controller 10.

Figure 3:
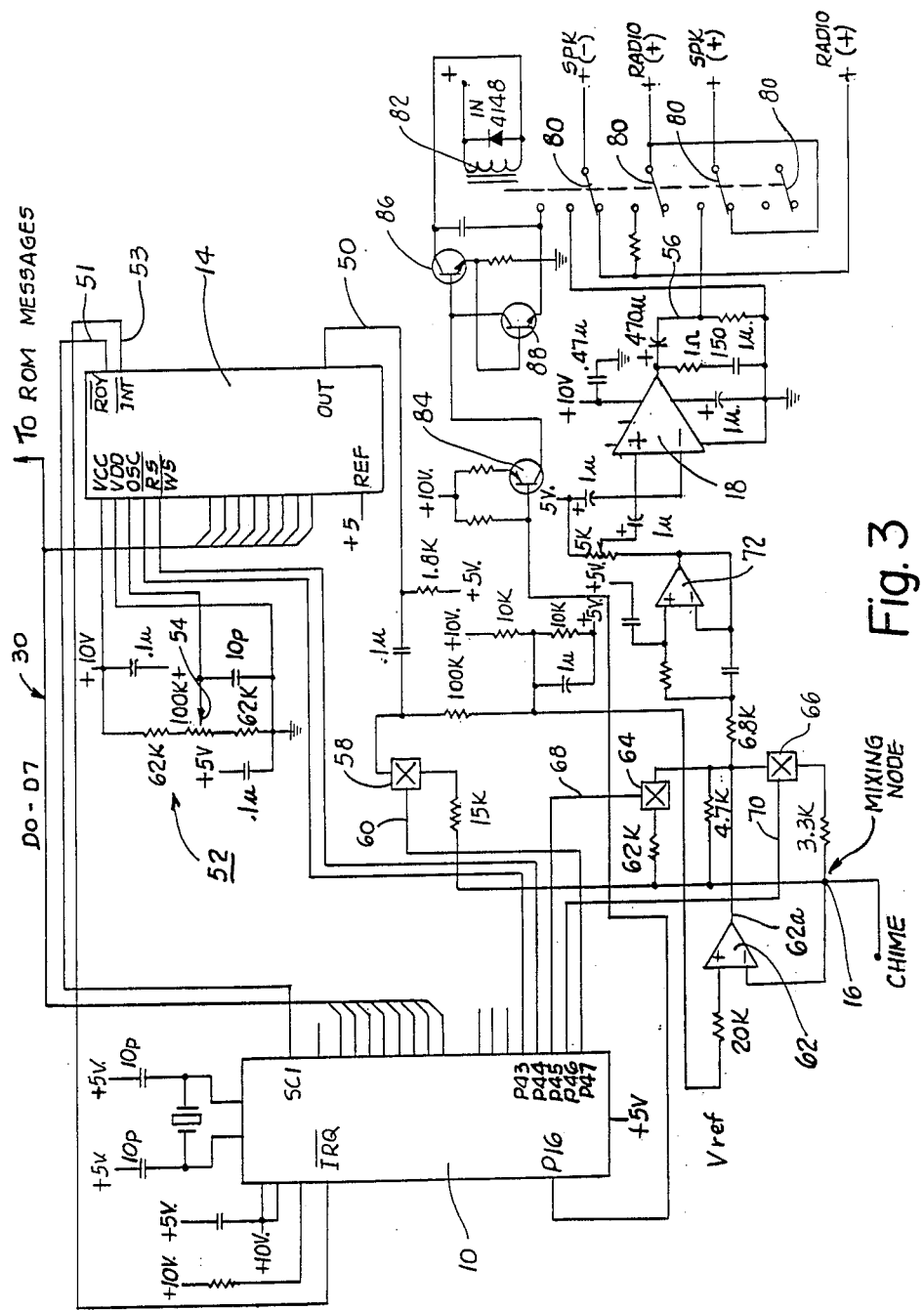
FIG. 3 is a schematic showing the control processor of FIG. 2 and a speech processor.

Turning now to FIG. 3, the controller 10 and data bus 30 are seen coupled to the speech synthesizer unit 14. The speech synthesizer unit 14 is a model TMS 5220 voice synthesis processor available from Texas Instruments Incorporated. The data manual for this processor entitled "TMS 5220 Voice Systhesis Processor Data Manual" copyright, 1982, describes in detail the operation of this unit. This data manual is incorporated herein by reference. The operation of this unit will be described briefly and additional details concerning its operation may be found in the incorporated reference manual.

Once the controller 10 has generated an appropriate address on the address bus 40 and caused the memory 26 to present data stored at this memory address on the data bus 30, the controller 10 must initiate a transfer of this data from the memory 26 to the speech synthesizer 14. The controller 10 interfaces the speech synthesizer 14 along the data bus 30 and via separate control lines for read operations, write operations, a ready indicator, and an interrupt to indicate the status of the voice synthesizer 14.

Synthesizer access to the data bus 30 is controlled by the read and write select lines and in particular a "high" input on the read select and "low" on the write select input causes the voice synthesizer 14 to latch onto data present on the data bus 30. Since the controller has previously caused the memory to present data from a particular memory location, the synthesizer latches onto this data and uses it in generating an analog output 50 corresponding to the speech data digitally stored in the memory 26. Since the voice unit 14 is slower than the processor 10, a ready output 51 from the speech synthesizer 14 gives an indication of the status of the speech synthesizer and causes the processor 10 to execute wait states while the speech processor 14 converts digital signals into an analog waveform corresponding to those signals. In addition, an interrupt output 53 from the speech processor can request specific action from the controller 10 via an input to the microprocessor interrupt pin IRQ.

The speech synthesizer unit 14 requires an oscillator circuit 52 for generating a 165 kilohertz clock signal. The clock circuit 52 includes a voltage divider 54 which can be set at the factory to produce oscillations for the speech synthesizer unit 14. The particular choice of resistors illustrated in FIG. 3 to form the voltage divider 54 results uniform oscillator operation even in the event the +5 and +10 volt inputs used to run the oscillator 52 vary during circuit operation.

Directly beneath the speech synthesizer unit in FIG. 3 is the audio amplifier 18 having an output 56 coupled to the vehicle speaker 20. The audio output 50 from the speech synthesizer 14 is coupled to an analog gate 58 having a gate input 60 coupled to pin P47 on the controller 10. When pin P47 goes "high", the output 50 from the speech synthesizer 14 is coupled to the mixing node 16 and then to a volume control amplifier 62. The analog gate 58 is referred to as a mute amplifier since by controlling pin P47, the controller 10 can effectively deactivate any speech and extraneous noise from the speech processor 14.

Two additional analog gates 64, 66 have gate inputs 68, 70 coupled to pins P45 and P46 on the controller 10. These analog gates 64, 66 are seen to control the feedback path from an output 62a of the volume amplifier 62 and the mixing node input 16 to that amplifier. By controlling the status of the two pins P45, P46, the feedback resistance is controlled and therefore the amplification factor of the amplifier 62 also controlled. The output 62a from the amplifier 62 is coupled to a buffer amplifier 72 having an output coupled to an input of the audio amplifier 18.

Interposed between the output 56 from the audio amplifier 18 and the vehicle speaker 20 are a series of four contact switches 80 which are opened and closed under control of a relay coil 82. The coil 82 is energized by the controller 10 by an output at pin P16 which drives a level shifting amplifier 84 and a coil driver having two transistors 86, 88. The purpose and function of the level shifting transistor 84 will be discussed below. The two transistors 86, 88 forming the drive circuit are constant current devices that regulate current flow through the relay coil 82. With the coil 82 energized, the switches 80 couple the amplifier 18 to the speaker and with the coil 82 deenergized the switches 80 couple the vehicle radio to the speaker.

Figure 5:
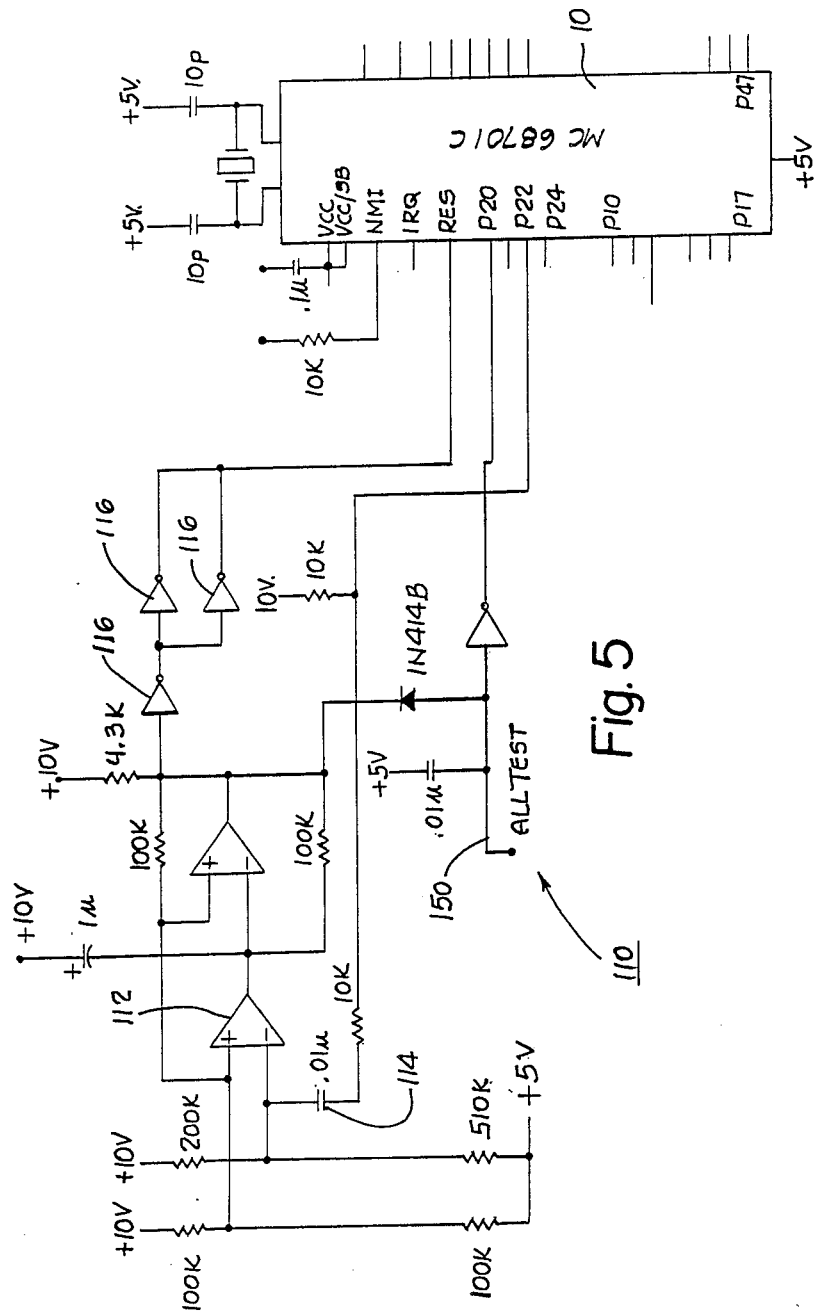
FIG. 5 is a schematic showing the control processor and support circuitry for insuring reliability of speech synthesizer operation.

Referring to FIG. 5, also called "dead man circuit" 110 is seen coupled to the controller 10 for monitoring controller operation. This circuit 110 also provides a power-up reset function. Pin P22 on the microprocessor generates a series of pulses which are coupled to the input of a comparator 112. The two comparator inputs are held at designated voltages by two voltage dividers to the left of the comparator 112. Unless the output from the microprocessd is received at periodic intervals a capacitor 114 will charge to a value sufficient to change an output from the comparator 112. This output will go "high" which results in an input of a low reset pulse to the microprocessor through a combination of inverter circuits 116 coupled to the comparator output. At power-up of the control system, these inverter circuits 116 also generate a low input to the microprocessor reset pin which assures a power on reset function.

Figure 6:
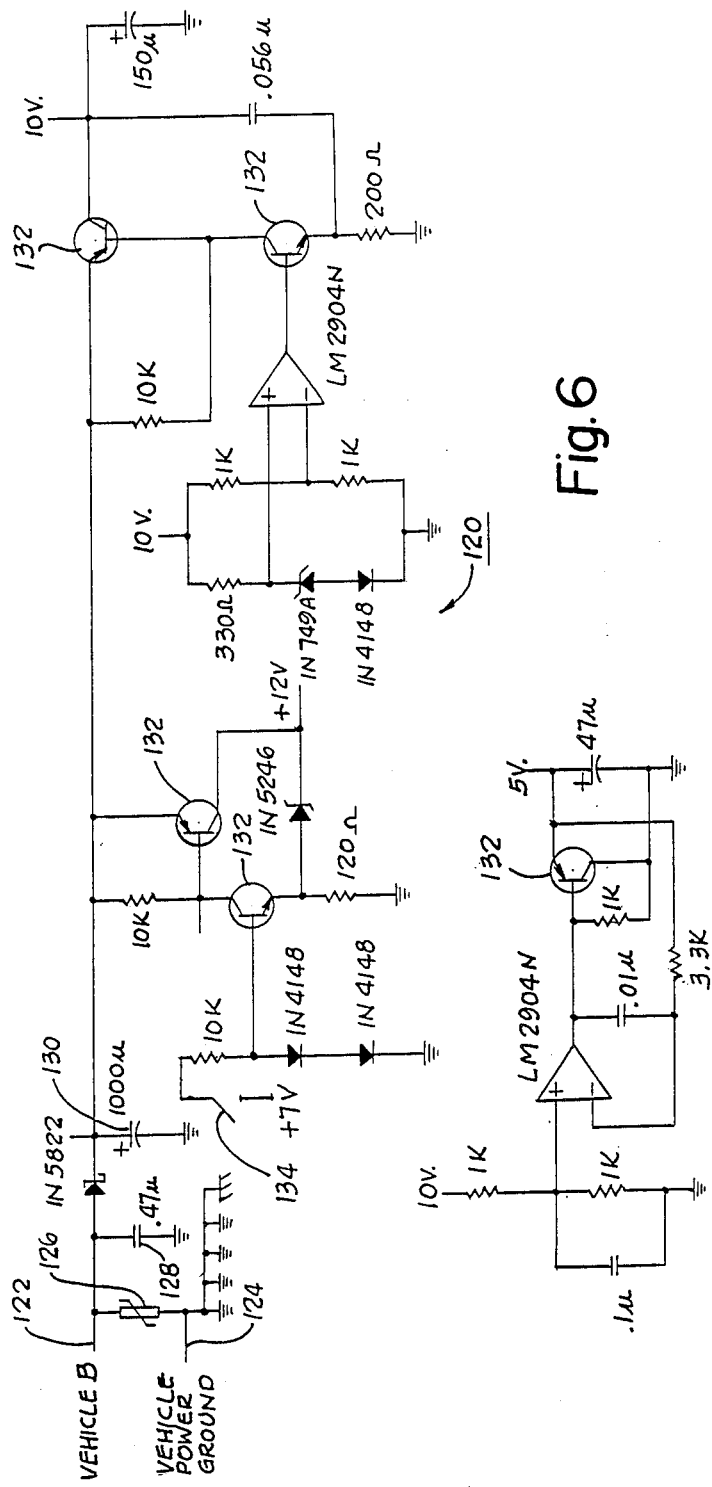
FIG. 6 is the speech control system power supply.

A system power supply 120 is illustrated in FIG. 6. At the extreme lefthand portion of FIG. 6 to a vehicle battery 122 and vehicle ground 124 are coupled to the power circuit 120. A Zener diode 126 and capacitors 128, 130 filter the input from the battery to prevent negative and positive transients from reaching the power circuit 120. The various transistors 132 illustrated in FIG. 6 generate regulated 12-volt, 10-volt, and 5-volt dc outputs when the ignition switch diagrammatically represented by a switch 134 is closed.

The speech processor unit 14 (FIG. 3) operates utilizing voltages of +5, ground, and −5 volts. Rather than generate negative voltage with respect to vehicle ground, the entire control system depicted in FIG. 1 has a voltage convention where control system ground is maintained at a voltage of +5 volts with respect to vehicle ground so that vehicle ground is used as the −5 volts for the speech unit 14. This protocol or convention requires that various leval shifting transistors be utilized wherever the voice synthesis control system is coupled to other electronics within the vehicle. Specifically, wherever a 10 volt level is encountererd in the voice synthesizer control, this must be shifted downward to +5 volts and a voltage of +5 volts for the speech synthesizer control is shifted to vehicle ground.

This protocol is illustrated in FIG. 4 where communication interconnections are shown coupled to the control processor 10. Interposed between the serial input 24 and pin P23 on the controller 10 is a level shifting transsisitor 140. When the serial input 24 is "high" (5 volts), the transistor 140 does not conduct and therefore, the input at pin P23 is held at 10 volts by the 10 volt supply coupled through the 10 kilohm resistor 142. when the serial input goes "low" (0 volts) the transister 140 conducts, and pulls the voltage at pin P23 to positive 5 volts. In this way, the +5 and 0 for high and low input at serial input 23 are converted to the +10 and +5 volt protocol used in the speech control system. In a similar manner, outputs from pin P15 from the controller 10 are level shifted by the transistors 144, 146 coupled to the busy line 22.

A special "all test" input 150 to the control system is coupled through an inverter 152 to pin P20 on the controller. A low input at this connection causes the controller 10 to enter an all test routine whereby each of the messages the system can generate is pronounced sequentially.

Figure 7:
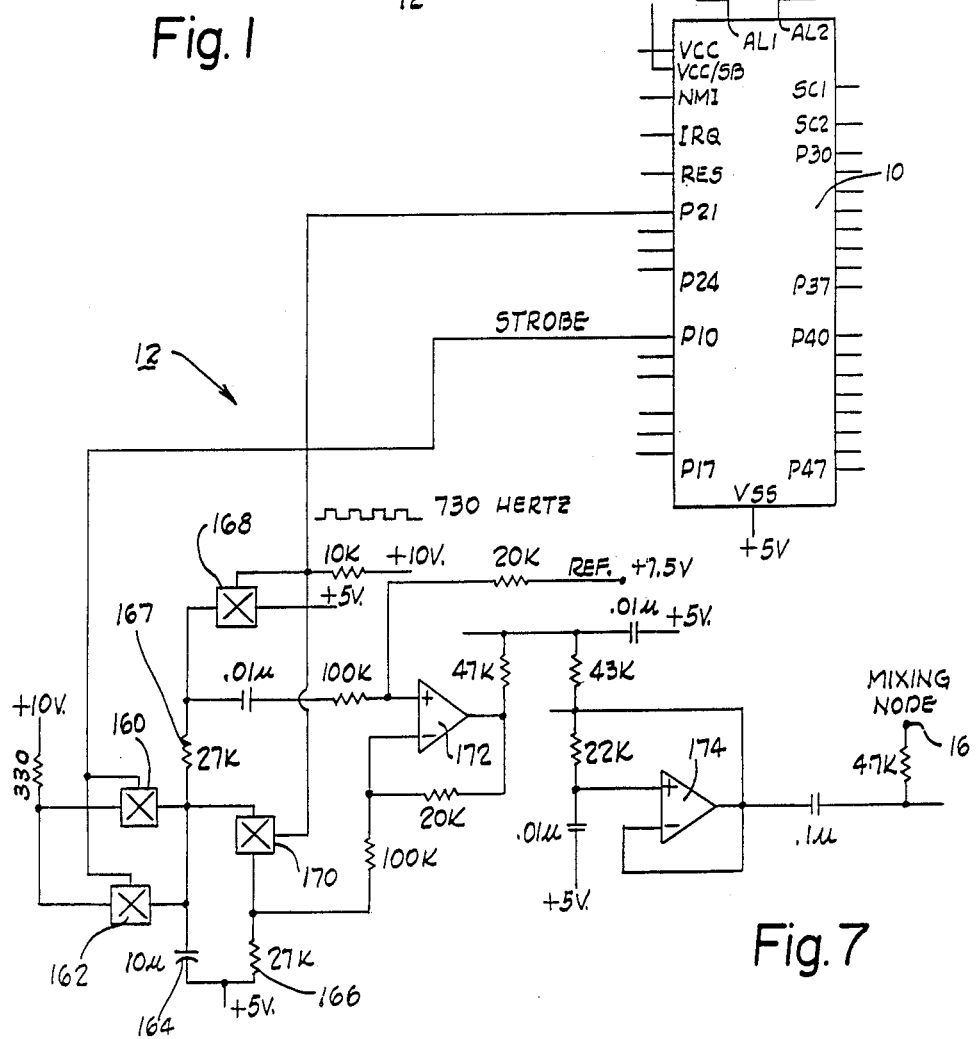
FIG. 7 is a schematic showing the control processor coupled to a chime circuit for generating an audible tone.

The chime circuit 12 is disclosed in FIG. 7. The chime circiut 12 has two connections to the control processor 10. The output from controller pin P21 is a series of pulses generated through a software interrupt in the 2K ROM operating system. These pulses are presented at pin P21 at a frequency of 730 hertz to produce an audible signal from the chime circuit 12 for transmission to the mixing node 16.

A strobe object at pin P10 of the controller 10 is coupled to the gate inputs of two analog gates 160, 162. Receipt by the analog gates of the strobe input causes a capacitor 164 to charge to an initial value of five volts. This capacitor 164 discharges with a time constant determined by its ten microfraad capacitance and the 27k resistors 166, 167. Subsequent to generation of the strobe output, periodic receipt of the frequency input from pin P21 selectively gates two additional analog gates 168, 170. Thse gates inputs cause the voltage across the capacitor 164 to be coupled across a differential amplifier 172. This voltage difference across the differential amplifier 172 is amplified, filtered and buffered by an amplifier 174 before being transmitted to the mixing node 16.

The alternate gating of the two analog gates 168, 170 provides a bi-polar differential amplifier output that avoids any deleterious affect due to d.c. voltage effects in the circuit. These effects produce harsh thumping turn-on sounds in prior art chime circuits.

When the gates 168, 170 are gated on by the 730 hertz signal, the non-inverting (+) input to the amplifier is coupled to control system ground (+5) by the gate 168 and the inverting input (−) is coupled to the positive side of the capacitor 164 by the gate 170.

When the gates 168, 179 are gated off, the non-inverting input (+) is coupled to the positive side of the capacitor and the inverting input (−) is grounded (+5).

By switching the relative polarity of the voltage across the differential amplifier a pure oscillating signal is amplied. This cancels any unwanted d.c. component of that signal and results in a pure chime.

An additional aspect of the invention is disclosed in FIG. 4A where an alternate communications circuit 200 is disclosed. Infomration is output from pin P24 on the controller 10 to a level shifting transaction 202 and to an input 203 on a data buffer 204. A voltage at the input 203 is converted to a relative signal across two communication lines 208, 209 coupled to a vehicle communications network.

The buffer 204 also transforms the voltage across the conductors 208, 209 to a signal on a buffer output 210. This signal is level shifted by a transistor 212 and coupled to pin P23 on the controller 10.

Both incoming and outgoing signals are sent along the conductors 208, 209, i.e. the vehicle communications network is bi-directional. Other messages may be present on the conductors 208, 209 and the controller 10 must determine when the network is free of other messages and available for use.

To determine the status of the communications lines 208, 209, the controller operating system begins each transmission with a status checking operation. The buffer 204 is configured so that the status of the lines 208, 209 is converted to an output at all times, even when the controller 10 is sending a message. To check the status (busy or available) of the lines 208, 209 the controller initially checks its output. If the output at pin P24 matches the input at pin P23 the controller has successfully taken over the network. If the output and input do not correspond, however, some other device is using the communications network so the controller stops communicating.

In one embodiment, the controller reads a packet of data in the data transmission and uses a check sum technique to dertemine if the packet it sent was the packet it read. If an error is encountered, (indicating the network is busy) the controller waits a random period of time and again attemps data transmission.

It is appreciated by one skilled in the art that the status of the controller pins mentioned are controlled and monitored by the 2k ROM operating system. This operating system can be programmed in many alternate ways so long as the aforementioned functions are incorporated.

The present invention has been described with a design of particularlity. It is the intent that the invention include all modifications and alterations from the disclosed design falling within the spirit or scope of the appended claims.

We claim:

1. Speech synthesizer apparatus comprising:
   control means for controlling enunciation of a number of voice messages;
   memory means for storing digital representations of a plurality of audible sounds, where each voice message includes one or more of said audible sounds;
   counter means coupled to the control means to respond to signals from the control means by sequentially counting through addresses in the memory means to a starting address for a particular audible sound; and
   synthesizer means for accessing data at an audible sound starting address and converting that data into an audible sound.

2. The apparatus of claim 1 where the counter means generates a plurality of address indicating outputs to the memory means and where said outputs are divided into at least two banks that are separately controlled by the control means.

3. In a motor vehicle control system including a speech processor for generating audible messages for a user concerning a status of said motor vehicle, said control system including one or more integrated circuits for monitoring the status of said vehicle and determining which messages are to be enunciated by the speech processor, power circuitry for generating operating voltages for both the speech processor and the integrated circuits comprising:
   power means coupled to a vehicle battery and vehicle ignition, said power means responsive to said ignition for generating regulated first and second positive voltages above a vehicle ground voltage, where said voltage is less than said second voltage and functions as a control system ground potential for the speech synthesizer and integrated circuits in said control system; and
   voltage control means for transmitting output signals from the control system to other vehicle systems, said voltage control means including level shifting means to convert signals from the control system at said first voltage to vehicle ground.

4. The power circuitry of claim 3 wherein said level shifting means also shifts voltages at the second voltage to a specific vehicle voltage above ground.

5. In a vehicle control system having control means to monitor the status of a vehicle condition, chime generating circuitry comprising:
   amplifier means having two inputs and an output, said output producing a signal dependent on the relative size and polarity of the two inputs;
   means for controlling the relative magnitude of a voltage across said inputs; and
   means for alternating the polarity of said inputs at a frequency to produce a bi-polar output at a frequency in the audible range.

6. The circuitry of claim 5 wherre in the means for controlling comprises a capacitor and resistor network that is charged to an initial value and discharges with a characteristic time constant to produce a damped oscillating bi-polar output.

7. The circuitry of claim 5 additionally comprising speech synthesizer means for generating analog speech signals which are directed to a mixing node coupled to said amplifier means output, and an audio amplifier means coupled to the mixing node for amplifying signal from either the chime circuit or the speech synthesizer means.

8. The circuit of claim 7 additionally comprising control means for selectively coupling audio signals from one or the other of said chime circuitry or said synthesizer by means of the mixing node.

9. The circuit of claim 7 additionally comprising control means for controlling a gain of the audio amplifier.

10. A method for generating an audible message with a speech synthesizer unit, said unit having message segments stored in a memory unit, comprising the steps of:
   determining an appropriate message for generation by said speech synthesizer unit;
   calculating one or more starting addresses within the memory unit to compose said message;
   clocking a memory select counter to produce memory address signals corresponding to said one or more starting addresses; and
   transmitting said message segments from the memory unit to the synthesizer subsequent to the clocking step.

11. The method of claim 10 wherein the speech synthesizer is part of a vehicle control system and the determining step includes a substep of monitoring a vehicle condition to determine what, if any, message to present to the speech synthesizer.

12. Speech synthesizer apparatus comprising:
   a speech synthesizer for converting digital message signals into analog speech signals;
   a synthesizer controller having means for controlling the synthesizer and a least one communications port for sending and receiving communications signals related to synthesizer operations; and
   said synthesizer controller including status checking means for determining appropriate intervals to send communications signals by comparing a test signal transmitted from the port with a signal received at said port to determine interference with other communications signal sources.

13. The synthesizer of claim 12 where the synthesizer controller comprises an input communications port and an output communications port and buffer means to echo the output of said port to the input to compare the input and output.

14. The synthesizer of claim 13 where the controller checks a first byte of a communications packet to assure no conflicting message source is communicating.

* * * * *